(12) United States Patent
Tenghoff (10) Patent No.: US 10,367,448 B2
(45) Date of Patent: Jul. 30, 2019

(54) SOLAR PANEL AWNING AND RELATED SYSTEMS AND METHODS

(71) Applicant: Olof Tenghoff, Orlando, FL (US)

(72) Inventor: Olof Tenghoff, Orlando, FL (US)

( * ) Notice: Subject to any disclaimer, the term of this patent is extended or adjusted under 35 U.S.C. 154(b) by 0 days.

(21) Appl. No.: 15/601,218

(22) Filed: May 22, 2017

(65) Prior Publication Data
US 2017/0336104 A1  Nov. 23, 2017

Related U.S. Application Data

(60) Provisional application No. 62/339,253, filed on May 20, 2016.

(51) Int. Cl.
| | | |
|---|---|---|
| *F03D 9/25* | (2016.01) | |
| *A45B 23/00* | (2006.01) | |

(Continued)

(52) U.S. Cl.
CPC ............. *H02S 30/20* (2014.12); *E04F 10/00* (2013.01); *E04F 10/005* (2013.01); *E04F 10/10* (2013.01); *F03D 9/255* (2017.02); *F24S 25/20* (2018.05); *F24S 30/425* (2018.05); *F24S 40/85* (2018.05); *H02S 10/12* (2014.12); *H02S 20/26* (2014.12); *H02S 20/30* (2014.12); *H02S 30/10* (2014.12);

(Continued)

(58) Field of Classification Search
CPC ........... E04F 10/00; E04F 10/04; E04F 10/10; H02S 20/22; H02S 20/26; H02S 30/20; H02S 20/30; H02S 30/10; F24S 25/20
See application file for complete search history.

(56) References Cited

U.S. PATENT DOCUMENTS

| 4,309,981 A | 1/1982 | Briggs et al. |
| 5,433,259 A | 7/1995 | Faludy |

(Continued)

FOREIGN PATENT DOCUMENTS

| CN | 103821288 A | 5/2014 |
| CN | 105040903 A | 11/2015 |

(Continued)

OTHER PUBLICATIONS

English machine translation of JP 2010-144456 A. (Year: 2010).*
Product Information, G-P LLC, "Strut Channel Systems—For Less," May 22, 2017, pp. 1-9.

*Primary Examiner* — Lindsey A Bernier
(74) *Attorney, Agent, or Firm* — Allen, Dyer, Doppelt + Gilchrist, PA (57) ABSTRACT

A solar panel awning device may include a solar panel having first and second opposing ends, first and second opposing sides extending between the first and second opposing ends, and first and second opposing major surfaces. The first major opposing surface defines a photovoltaic surface. The solar panel awning device may include first and second arms respectively coupled to the first and second opposing ends of the solar panel, and an actuator coupled to one of the first and second arms and configured to switch the solar panel between an extended position and a retracted position. In the retracted position, the solar panel is flat against a side of a building; in the extended position, the first opposing side is proximal to the side of the building and spaced apart from the side of the building; and the second opposing side is distal to the side of the building.

16 Claims, 13 Drawing Sheets

(51) Int. Cl.
    *E04F 10/00* (2006.01)
    *E04F 10/10* (2006.01)
    *F24S 25/20* (2018.01)
    *F24S 30/00* (2018.01)
    *F24S 40/80* (2018.01)
    *H02S 10/12* (2014.01)
    *H02S 20/26* (2014.01)
    *H02S 20/30* (2014.01)
    *H02S 30/10* (2014.01)
    *H02S 30/20* (2014.01)
    *F24S 30/425* (2018.01)

(52) U.S. Cl.
    CPC .............. *A45B 2023/0025* (2013.01); *A45B 2023/0093* (2013.01); *A45B 2200/1027* (2013.01); *F24S 2030/131* (2018.05); *Y02B 10/20* (2013.01); *Y02B 10/30* (2013.01); *Y02E 10/47* (2013.01); *Y02E 10/725* (2013.01)

(56) References Cited

U.S. PATENT DOCUMENTS

| | | |
|---|---|---|
| 2006/0090858 A1 | 5/2006 | Heidenreich |
| 2009/0032100 A1 | 2/2009 | Oak |
| 2010/0088970 A1 | 4/2010 | Miller |
| 2010/0282418 A1 | 11/2010 | Lucas |
| 2011/0048651 A1* | 3/2011 | Goth .................. E04F 10/0614 160/22 |
| 2012/0060436 A1* | 3/2012 | Zimmer, II .............. F41H 5/06 52/202 |

FOREIGN PATENT DOCUMENTS

| | | | |
|---|---|---|---|
| DE | 102007024211 | 11/2008 | |
| JP | 2010144456 A * | 7/2010 | .............. F24S 25/70 |
| WO | 2010006007 A1 | 1/2010 | |
| WO | WO2013171718 | 11/2013 | |

* cited by examiner

SOLAR PANEL AWNING AND RELATED SYSTEMS AND METHODS

RELATED APPLICATION

This application is based upon prior filed Application No. 62/339,253 filed May 20, 2016, the entire subject matter of which is incorporated herein by reference in its entirety.

TECHNICAL FIELD

The present disclosure relates to the field of solar energy generation devices, and, more particularly, to solar panel device and related methods.

BACKGROUND

Typical conventional window awnings are routinely used to block sunlight from entering windows. Because the purpose of an awning is usually to provide shade, they are typically placed in direct sunlight. Some awnings provide a dual purpose feature and can operate as hurricane shutters. These hurricane shutters can be retracted from the extended awning position to cover a window and protect it from impact from debris.

Some prior approaches have placed solar cells on the awning. In U.S. Patent Application Publication No. 2009/0032100 to Oak, the awning is equipped with pluralities of solar cell plates. The solar cell plates mounted awning can manually be positioned to follow the movement of the sun.

SUMMARY

Generally speaking, a solar panel awning device may include a solar panel having first and second opposing ends, first and second opposing sides extending between the first and second opposing ends, and first and second opposing major surfaces, the first major opposing surface defining a photovoltaic surface. The solar panel awning device may include first and second arms respectively coupled to the first and second opposing ends of the solar panel, and at least one actuator coupled to one of the first and second arms and configured to switch the solar panel between an extended position and a retracted position. In the retracted position, the solar panel is flat against a side of a building. In the extended position, the first opposing side is proximal to the side of the building and spaced apart from the side of the building, and the second opposing side is distal to the side of the building.

In some embodiments, the solar panel awning device may comprise a controller coupled to the at least one actuator and configured to selectively position the solar panel in the extended position to be substantially perpendicular with an incoming angle of sunlight. In the extended position, the first opposing side may extend laterally past an eave of the building. The at least one actuator may comprise first and second actuators respectively coupled the first and second arms.

More specifically, the solar panel awning device may further comprise first and second pairs of pivot arms respectively coupled to the first and second opposing ends of the solar panel adjacent the first opposing side of the solar panel. The at least one actuator may comprise a linear actuator, for example. The side of the building may comprise a window, and the solar panel may cover the window in the retracted position.

In some embodiments, the solar panel awning device may further include a panel support coupled to the first and second arms and the second opposing major surface of the solar panel. The solar panel awning device may also comprise a torsion bar coupled between the first and second pairs of pivot arms.

Another aspect is directed to a solar panel system. The solar panel system may include a mobile wireless communications device, and a solar panel awning device. The solar panel awning device may include a solar panel having first and second opposing ends, first and second opposing sides extending between the first and second opposing ends, and first and second opposing major surfaces, the first major opposing surface defining a photovoltaic surface. The solar panel awning device may include first and second arms respectively coupled to the first and second opposing ends of the solar panel, and at least one actuator coupled to one of the first and second arms and configured to switch the solar panel between an extended position and a retracted position. The solar panel awning device may include a controller coupled to the at least one actuator and in communication with the mobile wireless communications device. In the retracted position, the solar panel is flat against a side of a building. In the extended position, the first opposing side is proximal to the side of the building and spaced apart from the side of the building, and the second opposing side is distal to the side of the building. The mobile wireless communications device may be configured to cause the controller to selectively position the solar panel in the extended position to be substantially perpendicular with an incoming angle of sunlight.

A method is for making a solar panel awning device. The method may include providing a solar panel having first and second opposing ends, first and second opposing sides extending between the first and second opposing ends, and first and second opposing major surfaces, the first major opposing surface defining a photovoltaic surface. The method may include coupling first and second arms respectively to the first and second opposing ends of the solar panel, and coupling at least one actuator to one of the first and second arms and configured to switch the solar panel between an extended position and a retracted position. In the retracted position, the solar panel is flat against a side of a building. In the extended position, the first opposing side is proximal to the side of the building and spaced apart from the side of the building, and the second opposing side is distal to the side of the building.

DETAILED DESCRIPTION

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout.

Awnings equipped with solar panels are now available. Many of these awnings, however, suffer from the drawback that roof overhangs and the like can cast a shadow on the solar panels during some parts of the day, reducing the amount of electricity such an awning can produce.

A device that overcomes this drawback includes an awning mountable to a building outside the window. The awning has a photovoltaic surface oriented in a sunlight facing direction so as to intercept sunlight approaching the window. The photovoltaic surface includes a top perimeter positionable adjacent to a top of the window when mounted to the building. An actuator is connected to the awning in such a way that the actuator can change an angle of inclination of the awning relative to the window. When the angle of inclination changes, the distance between top perimeter and building also changes and moves the solar panels away from the building to expose more of the photovoltaic surface to sunlight.

A first embodiment of a solar device 100 for generating electricity and shading a window of a building is generally shown in FIGS. 1-6. The solar device 100 is mounted onto a building 200 having an outer wall 202 with a window 204 positioned along the outer wall 202 and beneath an overhanging structure 206 that can cast a shadow on the window 202 during the daytime.

The solar device 100 includes an awning 102 having a photovoltaic surface 104 oriented in a sunlight facing direction so as to intercept sunlight approaching the window. The photovoltaic surface 104 includes a top perimeter 106 positioned adjacent to a top of the window 208. The photovoltaic surface includes at least one photovoltaic panel 108 and, in the embodiments shown, includes a plurality of photovoltaic panels 108 that intercept the sunlight and convert it into electrical energy.

The orientation of the awning 102 is adjustable so as to change the angle of inclination A of the awning relative to the window 204. This allows the photovoltaic surface 104 to be maintained in a sunlight facing orientation as the sun moves across the sky through the day.

An actuator 109 is connected to the awning 102 in such a way that the actuator 109 can change the angle of inclination A. The actuator 109 may be, for example, a linear actuator such as telescoping linear actuator. The telescoping linear actuator includes a telescoping rod 110 that extends and retracts from a tube 112 with a motor positioned inside the tube 112. A motor mounted on, in, or connected to the tube 112 moves the rod 110 according to instructions received from an electronic controller 113. In alternative examples, the actuator 109 may be engaged manually.

Figure 1:
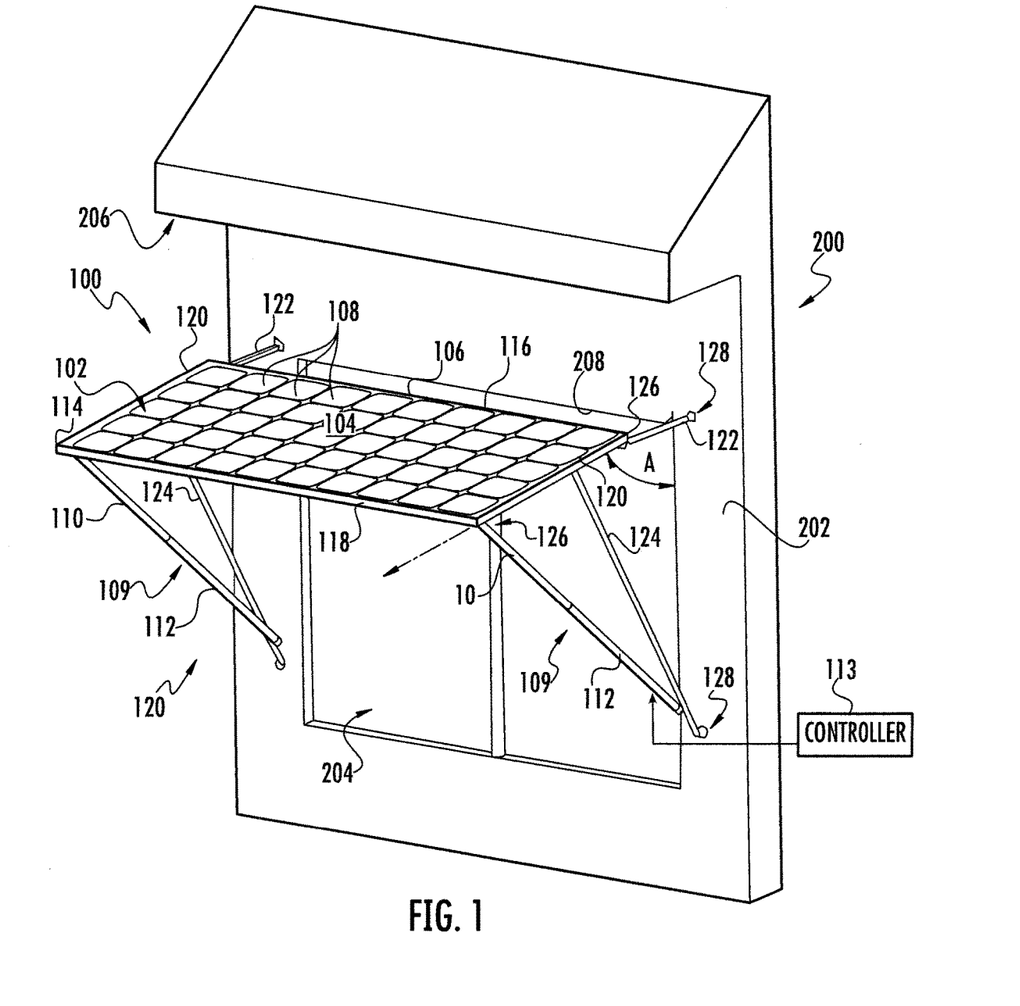
FIG. 1 is a perspective view of a first exemplary embodiment of the solar device mounted outside a window of a building beneath an overhanging structure, in a first position.
Figure 2:
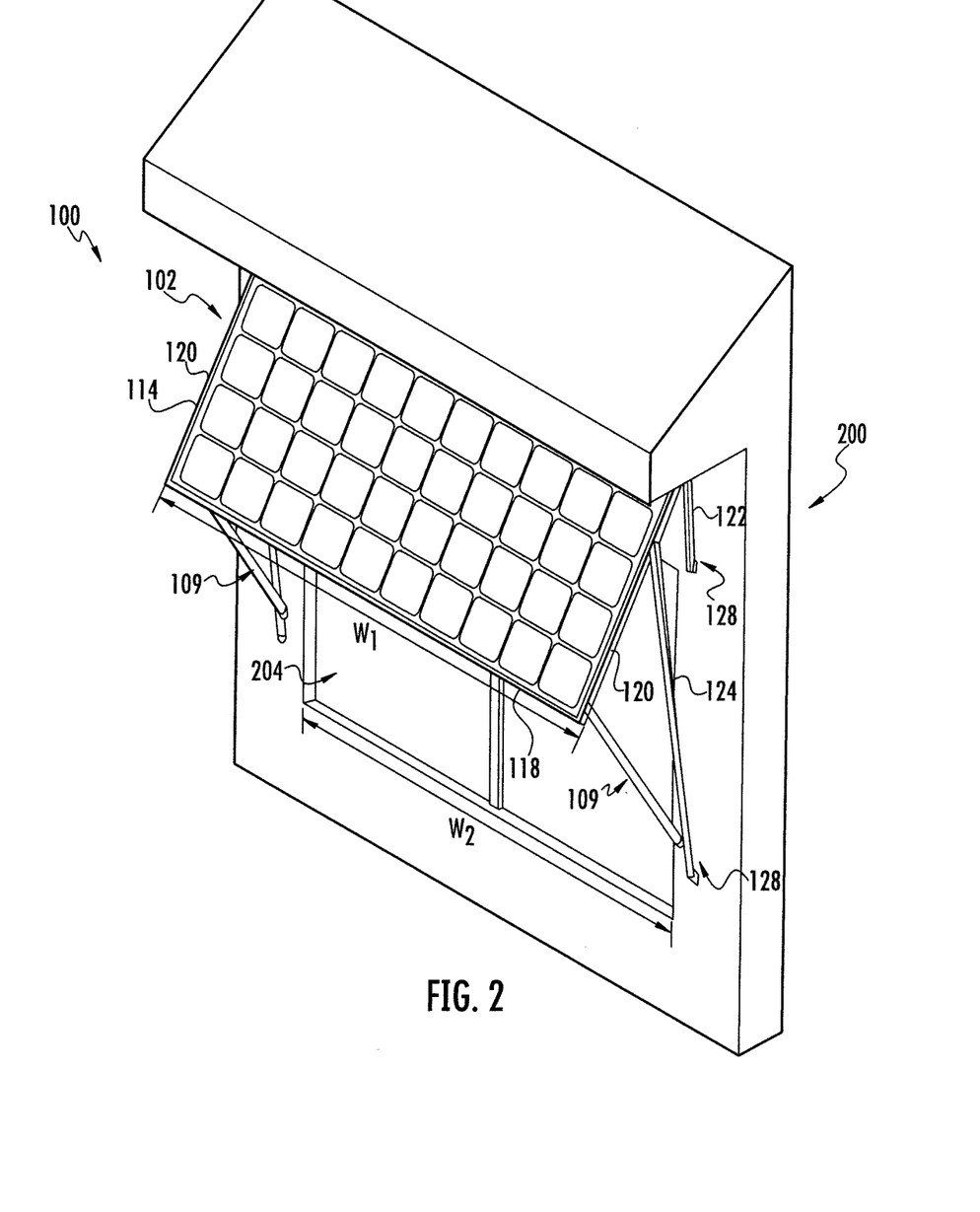
FIG. 2 is another perspective view of the device of FIG. 1 with the awning in a second position.
Figure 3:
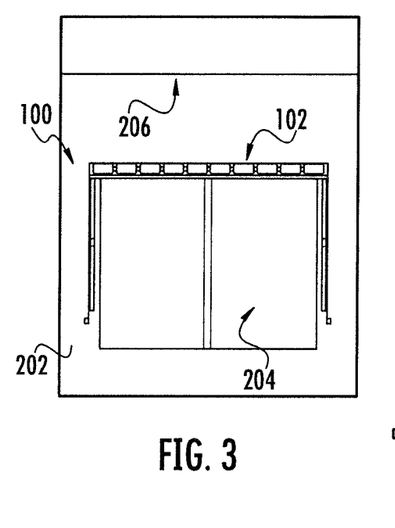
FIG. 3 is a front elevation view of the device of FIG. 1 with the awning in the first position.
Figure 4:
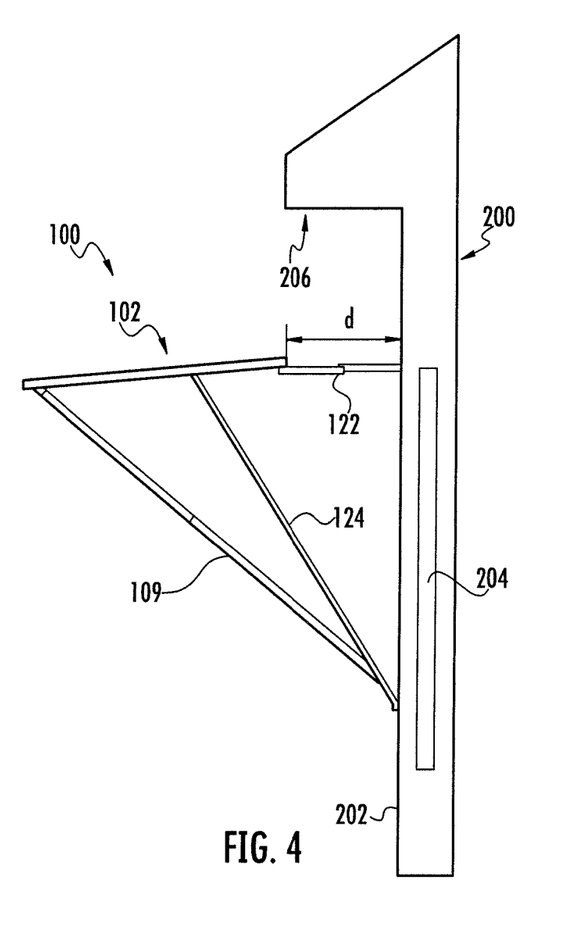
FIG. 4 is a right side elevation view of the device of FIG. 1 with the awning in the first position.
Figure 5:
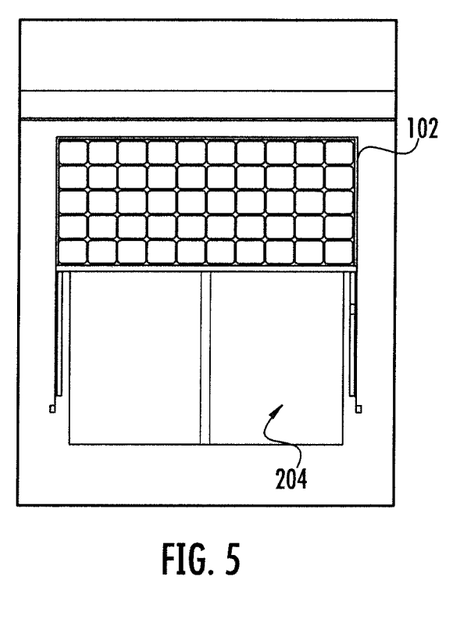
FIG. 5 is a front elevation view of the device of FIG. 1 with the awning in the second position.
Figure 6:
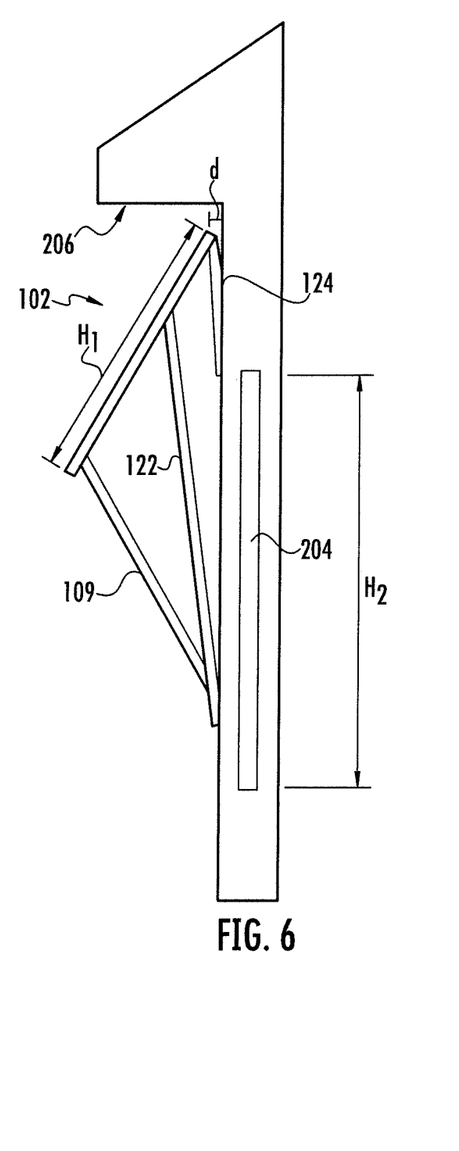
FIG. 6 is a right side elevation view of the device of FIG. 1 with the awning in the second position.

FIGS. 1, 3, and 4 show the actuator 109 with the rod 110 extended to place the awning 102 in a first position that is substantially horizontal relative to the building. FIGS. 2, 5, and 6 show the actuator 109 with the rod 110 retracted to place the awning 102 in a second position.

The angle of inclination A of the awning 102 is more acute in the second position than in the first position. Accordingly, when the awning 102 is in the second position it might be more efficient at generating electrical energy when the sun is low in the sky and, when it is in the first position, the awning 102 might be more efficient at generating electrical energy when the sun is high in the sky. The angle of inclination A can be varied between the first and second positions by extending and retracting the rod 110 of the actuator 109 to different extents.

A particularly advantageous feature of the device 100 is that a distance d between the top perimeter 106 and building 202 changes when the angle of inclination A changes. This allows for the top perimeter 106 to be moved further away from the building 202 and out of the shadow that might be cast by the overhanging structure 206, exposing more of the photovoltaic surface 104 to direct sunlight when the sun is high in the sky.

The awning 102 includes a frame 114 that carries the photovoltaic panels 108. The size and shape of the frame 114 will depend on the size and shape of the window 204. In a typical embodiment, the frame 114 has a width W1 that is substantially the same as or greater than the width W2 of the window 206. The height H1 of the frame may be less, greater than or substantially equal to the height H2 of the window.

Figure 7:
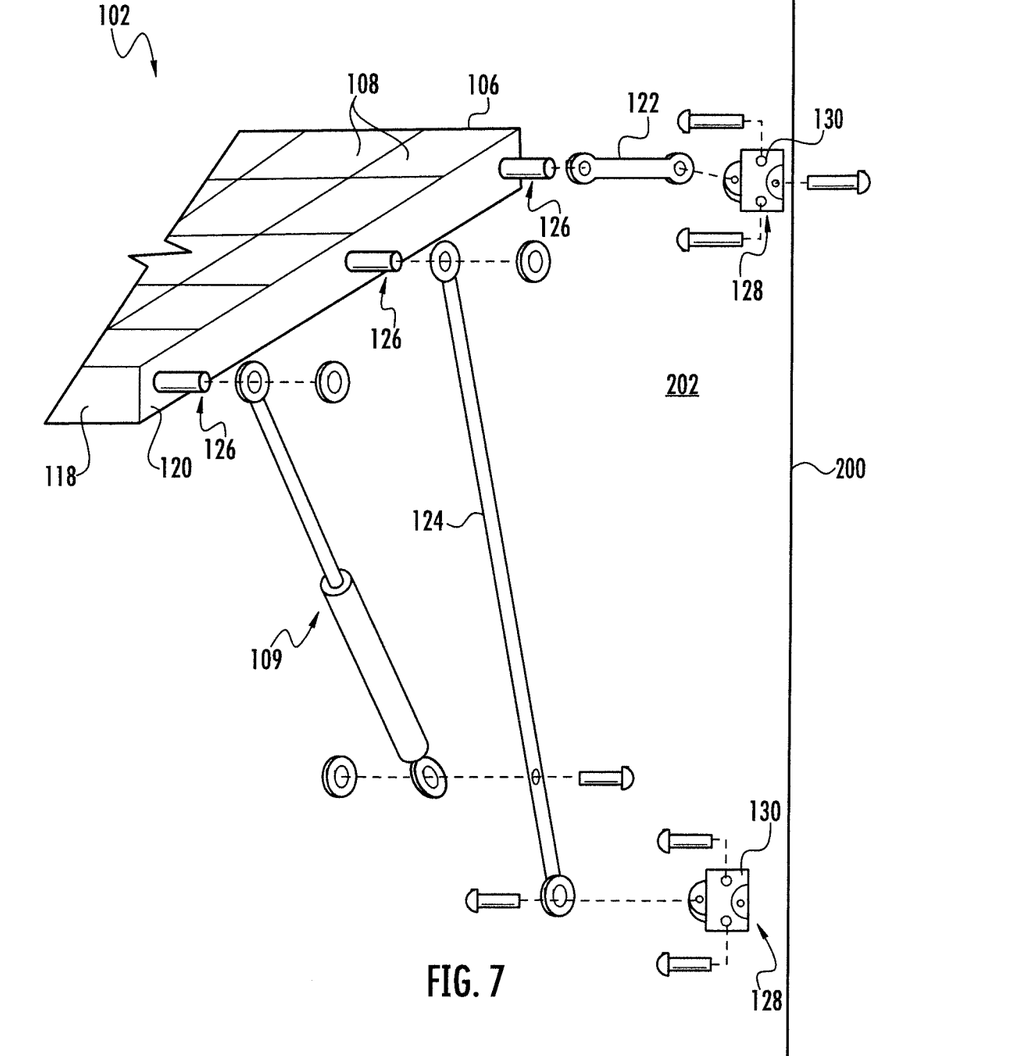
FIG. 7 is a partial exploded view of the device of FIG. 1.

Now also referring to FIG. 7, the frame 114 includes a plurality of sides that extend around the periphery of the photovoltaic surface 104. These sides include a top frame side 116 and a bottom frame side 118 separated by a pair of opposed vertical frame sides 120.

The frame 114 may be made of metal or any other rigid material strong enough to carry the photovoltaic panels 108. Although it would not be necessary for all embodiments, the frame 114 may typically be rectangular because windows 204 are typically rectangular.

The frame 114 may take many different forms aside from the example shown. The frame 114 essentially functions as support mechanism that upwardly supports the photovoltaic surface 104 and provides connection points for the actuator(s) 109 and support arms 122, 124. The design of the frame 114 may vary considerably, depending on the design of the photovoltaic panels 108, for example.

A support structure 120 connects to the frame for mounting the awning 102 to the building 200. The support structure includes at least one upper support arm 122 and at least one lower support arm 124. In the embodiment shown, the awning 102 includes a pair of upper support arms 122 and a pair of lower support arms 124. The upper support arms 122 and lower support arms 124 are attached to the frame 114 by a first conventional rotatable fastening mechanism 126 such as a hinge or the like. The upper support arms 122 and lower support arms 124 are attached to the building by a second conventional rotatable fastening mechanism 128 such as a hinge or the like, which includes a mounting bracket 130 affixed to the building with threaded fasteners or the like.

The upper support arms 122 are attached to the building 200 near the top 208 of the window 204 and extend outwardly away from the building 200 to their attachment points on the frame 114. The upper support arms 122 are attached to the frame 114 adjacent the top perimeter 106. The upper support arms 122 are generally shorter than the lower support arms 124. This arrangement allows the upper support arms 122 to hold the top of the awning 102 closer to the building 200 in the second position than the bottom of the awning 102.

The lower support arms 124 are attached to the building 200 closer to the bottom of the window 204 than the upper support arms 122 and closer to the bottom of the awning 102 than the upper support arms 122.

The actuators 108 are attached to the frame 114 closer to the bottom of the awning 102 than the lower support arms 124. In the embodiment shown, the actuators 108 are attached to the frame 114 adjacent the bottom end of the awning 102. The lower end of the actuators 108 are attached to a respective lower support arm 124. The attachment mechanism allows the actuator 109 to rotate about the lower support arm 124.

Figure 8:
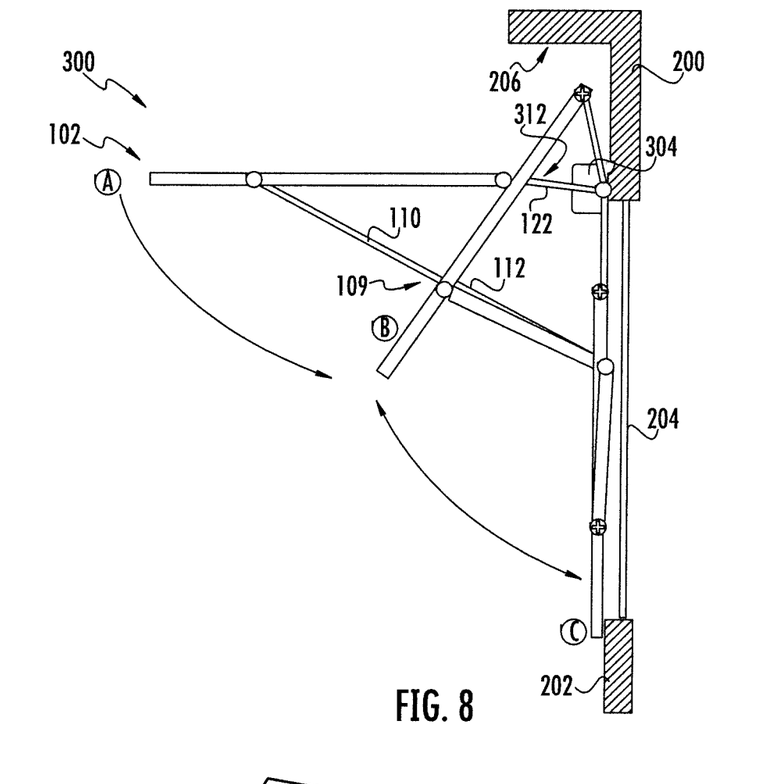
FIG. 8 is a right side elevation view of a second exemplary embodiment of the solar device mounted outside a window of a building beneath an overhanging structure, the awning is shown in three positions-A, B, and C.
Figure 9:
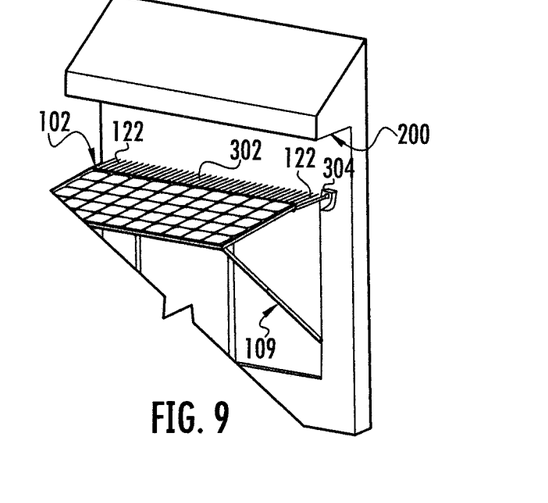
FIG. 9 is a perspective view of the device of FIG. 8 with the awning in position A.

A second embodiment of a solar device 300 will now be described by referring to FIGS. 8 and 9. Features that are in common with the first embodiment have the same reference numerals. The second embodiment is particularly adapted to further function as a storm shutter that protects the window 204 during high winds from flying debris as might occur during a hurricane or tornado.

The solar device 300 is constructed so that the awning 102 can be closed and substantially completely cover the window 204. FIG. 8 shows the awning in three positions: positions A, B, and C.

Compared to the solar device 100 of the first embodiment, the solar device 300 of the second embodiment includes a solid plate 302 that extends between the upper support arms 122. The plate 302 protects the top side 208 of the window 204 when the awning 102 is in position C in FIG. 8.

The solar device 300 also includes a second motorized actuator 304, which is a rotary actuator. The second actuator 304 is operably connected to at least one of the upper support arms 122 to assist with adjusting the awning's 102 angle of inclination.

Referring now to FIGS. 10-15, a solar panel system 60 according to the present disclosure is now described. The solar panel system 60 illustratively includes a mobile wireless communications device (e.g. a cellular device, tablet computing device, a personal computer, or an Internet of Things device) 46, and a solar panel awning device 30. It should be appreciated that all of the features disclosed in the solar device 100 described hereinabove may be included in this device.

The solar panel awning device 30 illustratively includes a solar panel 34 having first and second opposing ends 37, 38, first and second opposing sides 35, 36 extending between the first and second opposing ends, and first and second opposing major surfaces 39, 40. The first major opposing surface 39 defines a photovoltaic surface.

Figure 10:
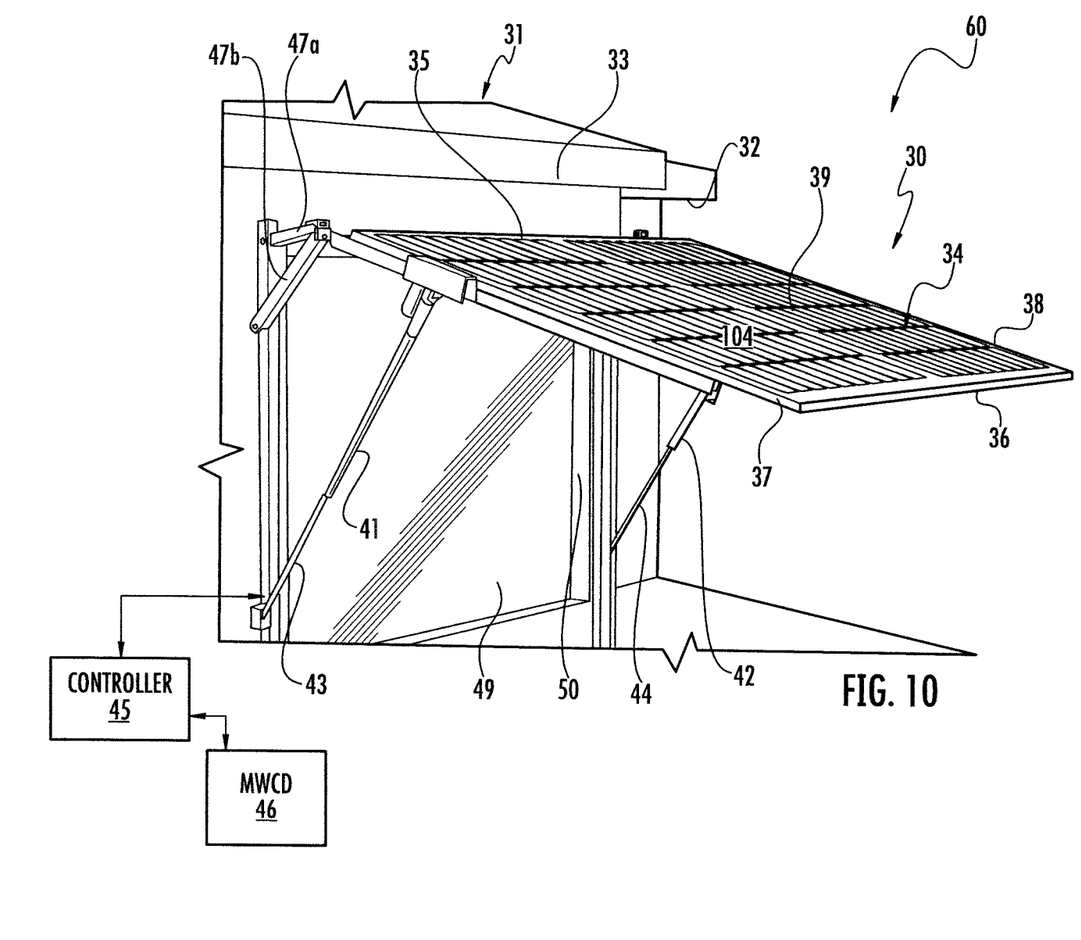
FIG. 10 is a perspective view of a solar panel awning device, according to an example embodiment, in the extended position.
Figure 11:
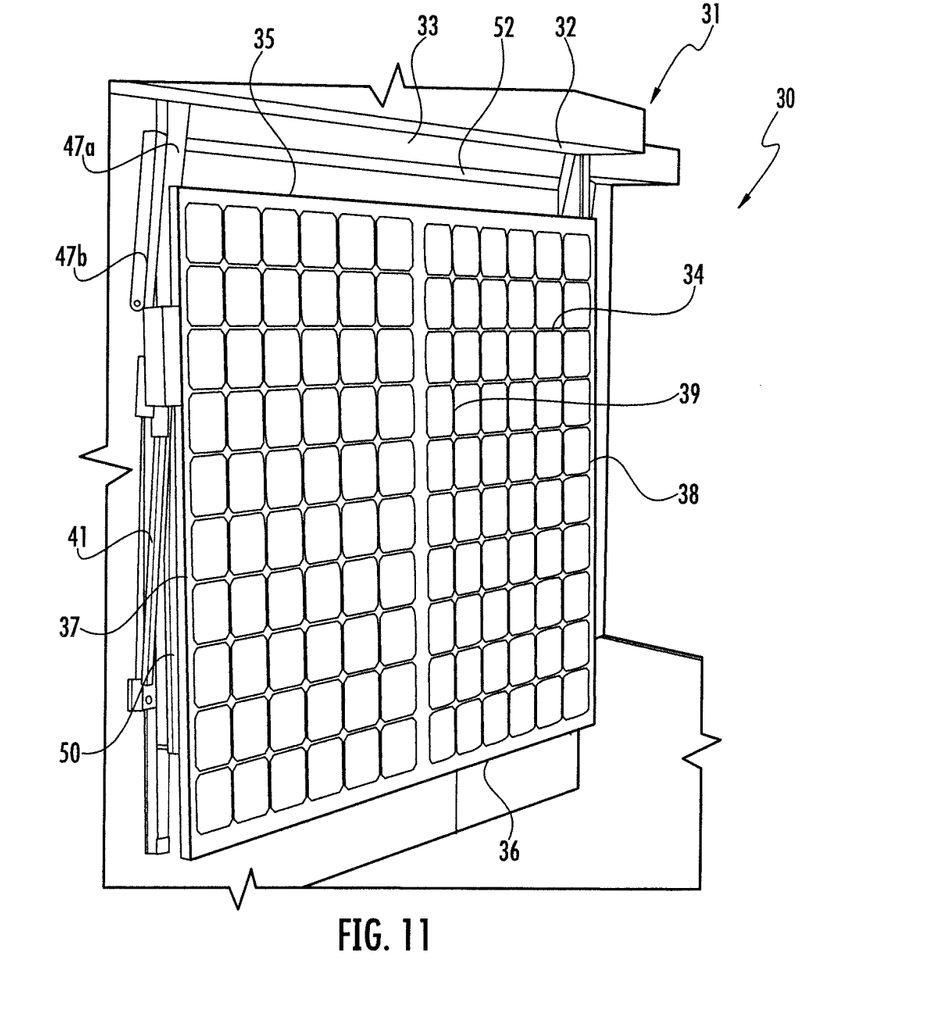
FIG. 11 is a perspective view of the solar panel awning device from FIG. 10 in the retracted position.

The solar panel awning device 30 illustratively includes first and second arms 41, 42 respectively coupled to the first and second opposing ends 37, 38 of the solar panel 34, and first and second actuators 43, 44 respectively coupled to the first and second arms and configured to switch the solar panel between an extended position (FIG. 10) and a retracted position (FIG. 11). In the retracted position, the solar panel 34 is flat against a side 33 of a building 31. In the extended position, the first opposing side 35 is proximal to the side 33 of the building 31 and spaced apart from the side of the building, and the second opposing side 36 is distal to the side of the building. In the extended position, the first opposing side 35 extends laterally past an eave 32 of the building 31.

In the illustrated embodiment, the solar panel awning device 30 comprises a controller 45 coupled to the first and second actuators 43, 44 and in communication with the mobile wireless communications device 46. In some embodiments, the solar panel awning device 30 comprises a single actuator for extending and retracting the solar panel 34. The controller 45 is configured to selectively position the solar panel 34 in the extended position to be substantially perpendicular with an incoming angle of sunlight, for example, between 60°-120°.

In some embodiments, the mobile wireless communications device 46 includes software stored therein for selectively activating the solar panel awning device 30. In particular, the software may store a current date/time, and a geographic location of the building 31. The software may then access data related to the sun's position in the sky, and automatically adjust the position of the solar panel 34 to track the sun during the day. Indeed, the software may access weather data for the geographic location of the building 31 and may retract the solar panel 34 when predicted wind speed exceeds a threshold.

Also, the software may be coupled with home automation devices, such as a home alarm system and a smart smoke detectors. In these embodiments, the software would cause all solar panel awning devices 30 in the building 31 to move to the extended position when a smart smoke alarm is activated, thereby avoiding covering any windows 49 and preventing egress. Additionally, when the home alarm system is placed in armed away mode, the software may cause all solar panel awning devices 30 in the building 31 to move to the retracted position, thereby covered all windows 49 and providing enhanced physical security.

More specifically, the solar panel awning device 30 illustratively includes first and second pairs of pivot/control arms 47a-47b, 48a-48b respectively coupled to the first and second opposing ends 37, 38 of the solar panel 34 adjacent the first opposing side 35 of the solar panel. The first and second actuators 43, 44 may each comprise a linear actuator, for example. As perhaps best seen in FIGS. 10-12, the side 33 of the building 31 comprises a window 49, and the solar panel 34 may completely or substantially (i.e. >95% coverage) cover the window in the retracted position.

In the illustrated embodiment, the photovoltaic surface comprises first and second rectangular solar panels. Nevertheless, in other embodiments, the photovoltaic surface comprises a single solar panel. Of course in other embodiments, the shape of the window may be different, such as a square-shaped window, a circle-top window, a quarter arch window, or a cathedral-shaped window. In these non-rectangle embodiments, the solar panel 34 would include a plurality of solar cells arranged into the non-rectangle shape of the window.

The solar panel awning device 30 illustratively includes a panel support 50 coupled to the first and second arms 41, 42 and the second opposing major surface 40 of the solar panel 34. The solar panel awning device 30 illustratively includes a torsion bar 52 coupled between the first and second pairs of pivot arms 47a-47b, 48a-48b.

Figure 12:
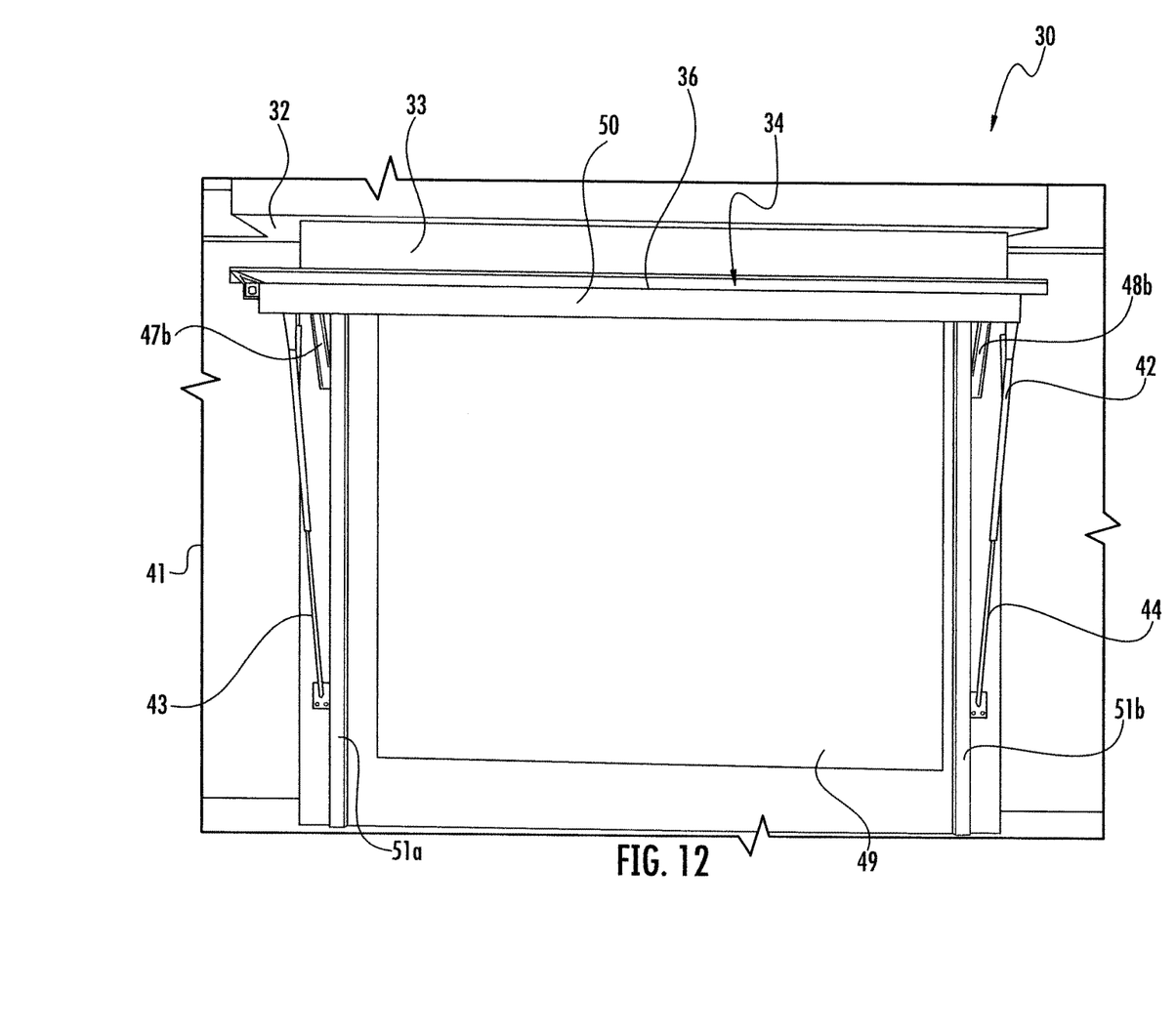
FIG. 12 is a front elevation view of the solar panel awning device from FIG. 10 in the extended position.
Figure 13:
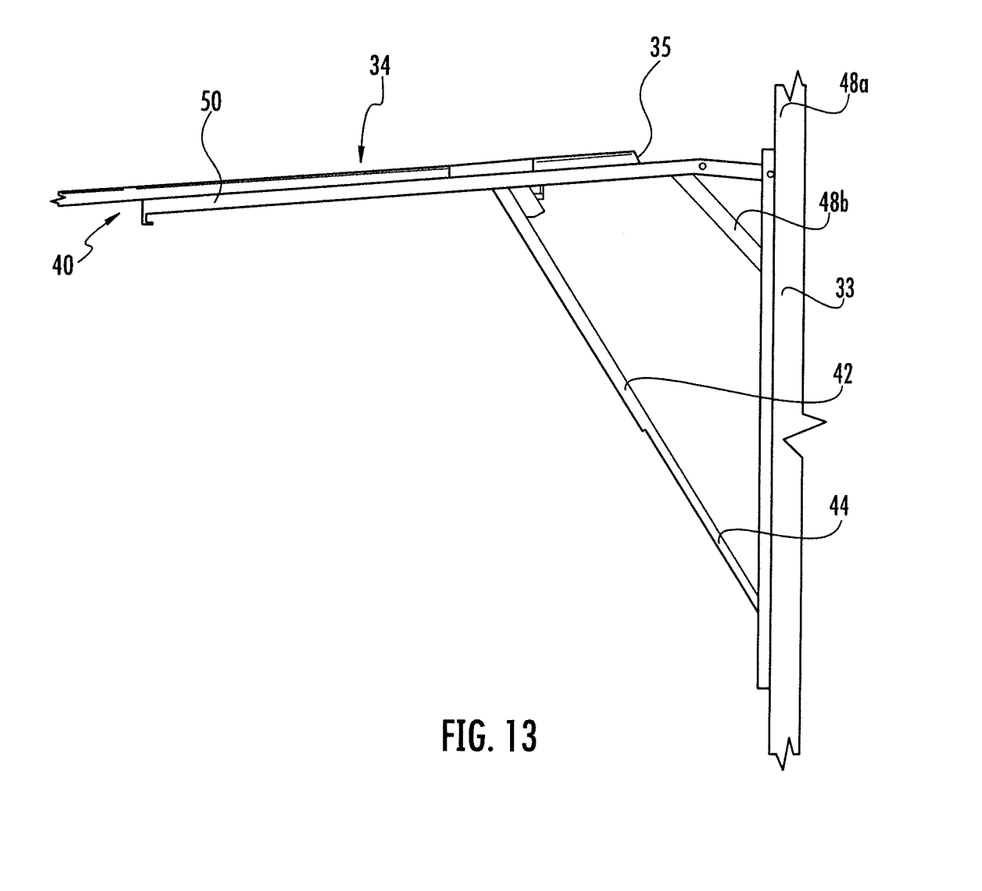
FIG. 13 is a right side elevation view of the solar panel awning device from FIG. 10 in the extended position.
Figure 14:
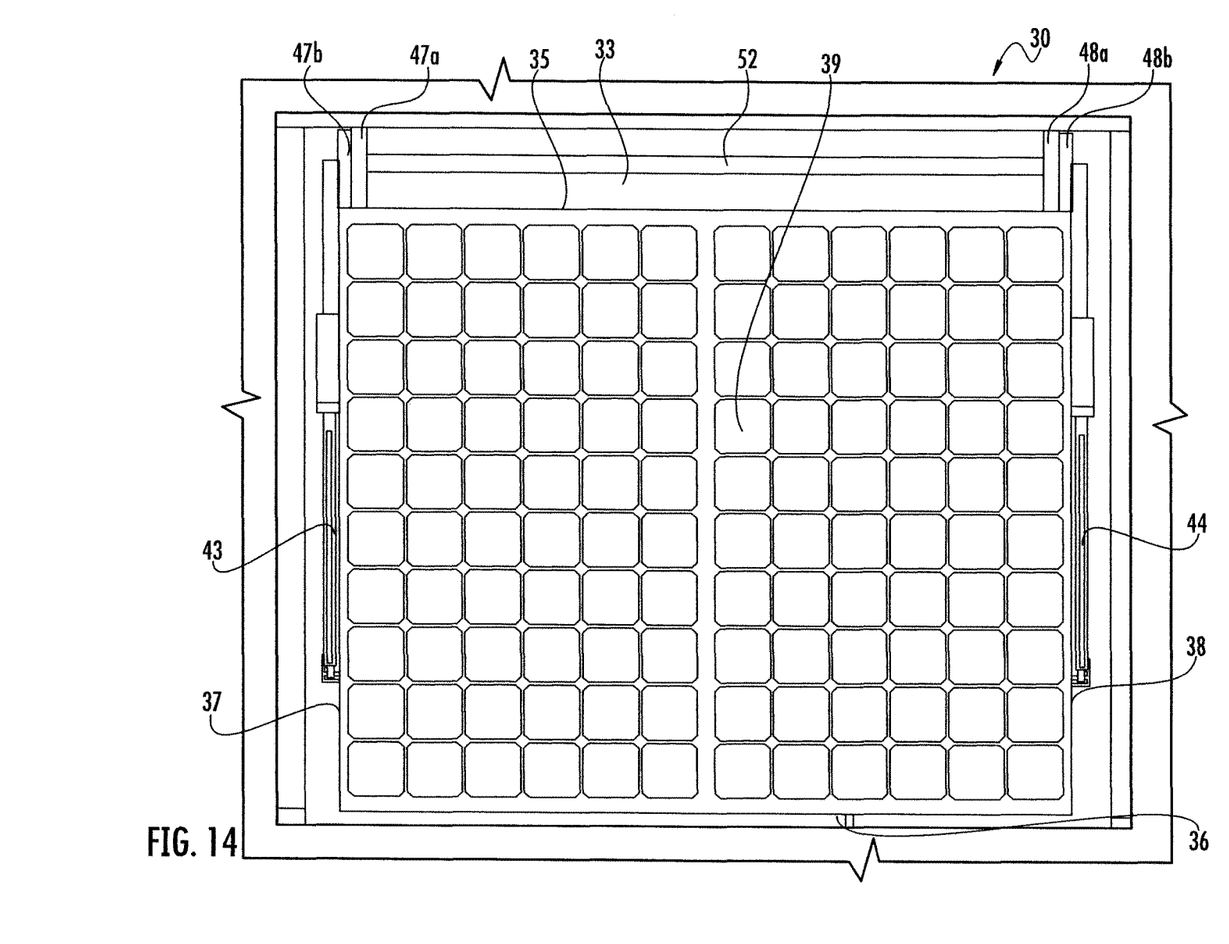
FIG. 14 is a front elevation view of the solar panel awning device from FIG. 10 in the retracted position.
Figure 15:
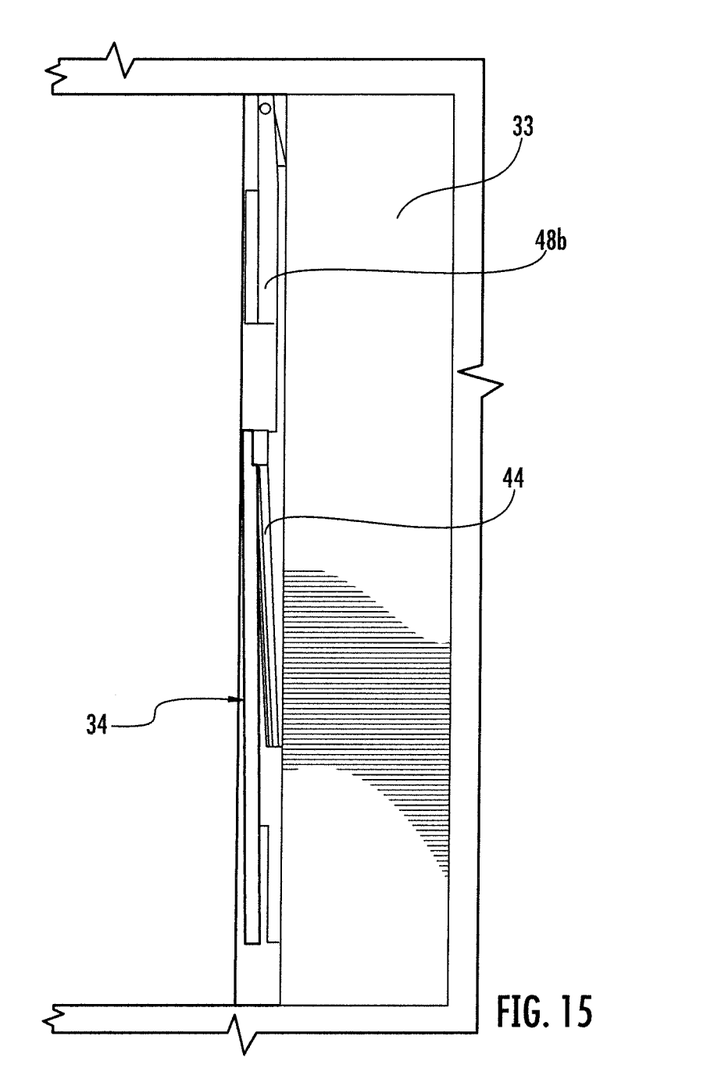
FIG. 15 is a right side elevation view of the solar panel awning device from FIG. 10 in the retracted position.
Figure 16:
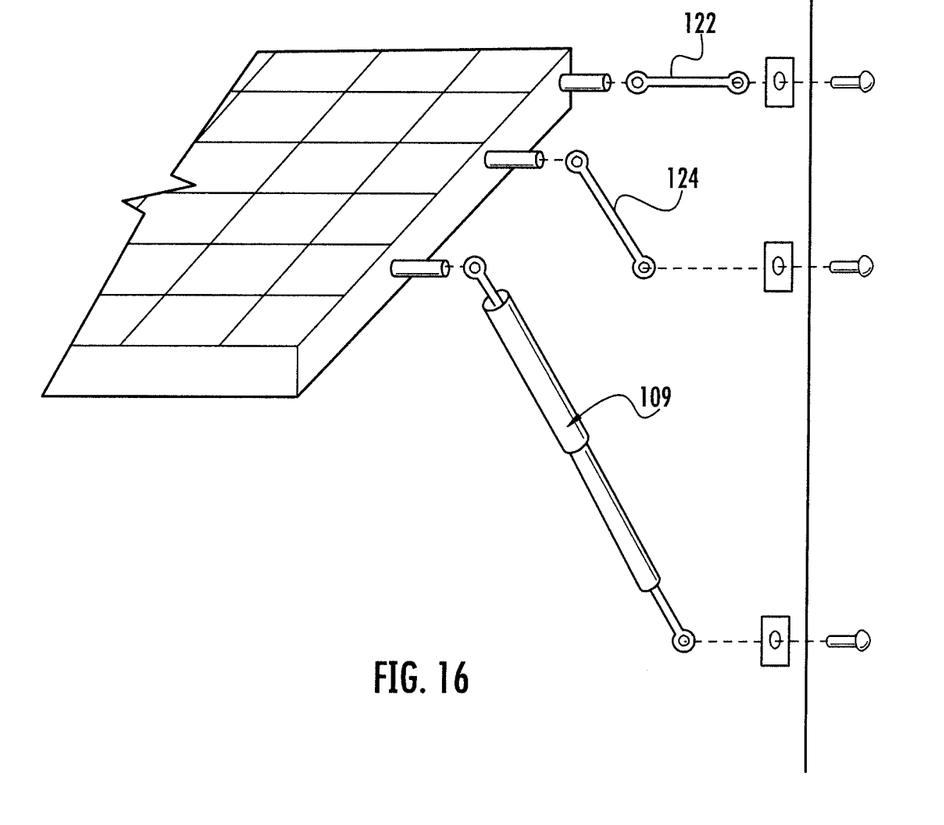
FIG. 16 is a partial exploded view of the solar panel awning device from FIG. 10.

As perhaps best seen in FIG. 12, the solar panel awning device 30 illustratively includes first and second wall support braces 51a, 51b coupled to the side 33 of the building 31, and flanking the window 49. The first and second wall support braces 51a, 51b are coupled to the side 33 of the building 31 via a plurality of fasteners (e.g. threaded screws).

Another aspect is directed to a solar panel system 60. The solar panel system 60 illustratively includes a mobile wireless communications device 46, and a solar panel awning device 30. The solar panel awning device 30 illustratively includes a solar panel 34 having first and second opposing ends 37, 38, first and second opposing sides 35, 36 extending between the first and second opposing ends, and first and second opposing major surfaces 39, 40, the first major opposing surface defining a photovoltaic surface. The solar panel awning device 30 illustratively includes first and second arms 41, 42 respectively coupled to the first and second opposing ends 37, 38 of the solar panel 34, and first and second actuators 43, 44 coupled respectively to the first and second arms and configured to switch the solar panel between an extended position and a retracted position. In the retracted position, the solar panel 34 is flat against a side 33 of a building 31. The solar panel awning device 30 includes a controller 45 coupled to the first and second actuators 43, 44 and in communication with the mobile wireless communications device 46. In the extended position, the first opposing side 35 is proximal to the side 33 of the building 31 and spaced apart from the side of the building, and the second opposing side 36 is distal to the side of the building. The mobile wireless communications device 46 is configured to cause the controller 45 to selectively position the solar panel 34 in the extended position to be substantially perpendicular with an incoming angle of sunlight.

A method is for making a solar panel awning device 30. The method includes providing a solar panel 34 having first and second opposing ends 37, 38, first and second opposing sides 35, 36 extending between the first and second opposing ends, and first and second opposing major surfaces 39, 40, the first major opposing surface defining a photovoltaic surface. The method includes coupling first and second arms 41, 42 respectively to the first and second opposing ends 37, 38 of the solar panel 34, and coupling first and second actuators 43, 44 to one of the first and second arms and configured to switch the solar panel between an extended position and a retracted position. In the retracted position, the solar panel 34 is flat against a side 33 of a building 31. In the extended position, the first opposing side 35 is proximal to the side 33 of the building 31 and spaced apart from the side of the building, and the second opposing side 36 is distal to the side of the building.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A solar panel awning device comprising:
    a solar panel having first and second opposing ends, first and second opposing sides extending between said first and second opposing ends, and first and second opposing major surfaces, said first major opposing surface defining a photovoltaic surface;
    first and second arms respectively coupled to said first and second opposing ends of said solar panel;
    at least one actuator coupled to one of said first and second arms and configured to switch the solar panel between an extended position and a retracted position; and
    first and second pivot arms respectively coupled to said first and second opposing ends of said solar panel adjacent the first opposing side of said solar panel, the first and second pivot arms being separate from and spaced apart from said first and second arms;
    said first and second arms, and said first and second pivot arms configured to, in the retracted position, fold said solar panel flat against a side of a building;
    said first and second arms, and said first and second pivot arms configured to, in the extended position, extend both the first opposing side and the second opposing side of said solar panel so that
        said first opposing side is proximal to the side of the building and spaced apart from the side of the building,
        said second opposing side is distal to the side of the building, and
        said first opposing side extends laterally past an eave of the building;
    wherein said first and second arms and said first and second pivot arms each have a first end and an opposing second end, the first end of each of said first and second arms and said first and second pivot arms being attached to the side of the building;
    wherein each of said first and second arms is configured to rotate at the first end and the second end to switch from the retracted position to the extended position; and
    wherein each of said first and second pivot arms is configured to rotate at the first end to switch from the retracted position to the extended position.

2. The solar panel awning device of claim 1 further comprising a controller coupled to said at least one actuator and configured to selectively position said solar panel in the extended position to be substantially perpendicular with an incoming angle of sunlight.

3. The solar panel awning device of claim 1 wherein said at least one actuator comprises first and second actuators respectively coupled to said first and second arms.

4. The solar panel awning device of claim 1 further comprising a torsion bar coupled between said first and second pivot arms.

5. The solar panel awning device of claim 1 wherein said at least one actuator comprises a linear actuator.

6. The solar panel awning device of claim 1 wherein the side of the building comprises a window; and wherein said solar panel covers the window in the retracted position.

7. The solar panel awning device of claim 1 further comprising a panel support coupled to said first and second arms and the second opposing major surface of said solar panel.

8. A method of making a solar panel awning device, the method comprising:
    providing a solar panel having first and second opposing ends, first and second opposing sides extending between the first and second opposing ends, and first and second opposing major surfaces, the first major opposing surface defining a photovoltaic surface;

coupling first and second arms respectively to the first and second opposing ends of the solar panel;
coupling at least one actuator to one of the first and second arms and configured to switch the solar panel between an extended position and a retracted position; and
coupling first and second pivot arms respectively to the first and second opposing ends of the solar panel adjacent the first opposing side of the solar panel, the first and second pivot arms being separate from and spaced apart from the first and second arms;
the first and second arms, and the first and second pivot arms configured to, in the retracted position, fold the solar panel flat against a side of a building;
the first and second arms, and the first and second pivot arms configured to, in the extended position, extend both the first opposing side and the second opposing side of the solar panel so that
the first opposing side is proximal to the side of the building and spaced apart from the side of the building,
the second opposing side is distal to the side of the building, and
the first opposing side extends laterally past an eave of the building;
wherein the first and second arms and the first and second pivot arms each have a first end and an opposing second end, the first end of each of the first and second arms and the first and second pivot arms being attached to the side of the building;
wherein each of the first and second arms is configured to rotate at the first end and the second end to switch from the retracted position to the extended position; and
wherein each of the first and second pivot arms is configured to rotate at the first end to switch from the retracted position to the extended position.

9. The method of claim 8 further comprising coupling a controller to the at least one actuator and configured to selectively position the solar panel in the extended position to be substantially perpendicular with an incoming angle of sunlight.

10. A solar panel awning device comprising:
a solar panel having first and second opposing ends, first and second opposing sides extending between said first and second opposing ends, and first and second opposing major surfaces, said first major opposing surface defining a photovoltaic surface;
first and second arms respectively coupled to said first and second opposing ends of said solar panel;
at least one actuator coupled to one of said first and second arms and configured to switch the solar panel between an extended position and a retracted position; and
first and second extension arms respectively coupled to said first and second opposing ends of said solar panel at the first opposing side of said solar panel, the first and second extension arms being separate from and spaced apart from said first and second arms;
said first and second arms, and said first and second extension arms configured to, in the retracted position, fold said solar panel flat against a side of a building;
said first and second arms, and said first and second extension arms configured to, in the extended position, extend both the first opposing side and the second opposing side of said solar panel so that
said first opposing side is proximal to the side of the building and spaced apart from the side of the building,
said second opposing side is distal to the side of the building, and
said first opposing side extends laterally past an eave of the building;
wherein said first and second arms and said first and second extension arms each have a first end and an opposing second end, the first end of each of said first and second arms and said first and second extension arms being attached to the side of the building;
wherein each of said first and second arms is configured to rotate at the first end and the second end to switch from the retracted position to the extended position; and
wherein each of said first and second extension arms is configured to rotate at the first end to switch from the retracted position to the extended position.

11. The solar panel awning device of claim 10 further comprising a controller coupled to said at least one actuator and configured to selectively position said solar panel in the extended position to be substantially perpendicular with an incoming angle of sunlight.

12. The solar panel awning device of claim 10 wherein said at least one actuator comprises first and second actuators respectively coupled to said first and second arms.

13. The solar panel awning device of claim 10 further comprising a torsion bar coupled between said first and second extension arms.

14. The solar panel awning device of claim 10 wherein said at least one actuator comprises a linear actuator.

15. The solar panel awning device of claim 10 wherein the side of the building comprises a window; and wherein said solar panel covers the window in the retracted position.

16. The solar panel awning device of claim 10 further comprising a panel support coupled to said first and second arms and the second opposing major surface of said solar panel.

* * * * *